United States Patent
Bingham et al.

(10) Patent No.: US 11,247,167 B2
(45) Date of Patent: Feb. 15, 2022

(54) SCAVENGING SYSTEM INCLUDING AT LEAST ONE MIXED ACETAL COMPOUND TO REMOVE HYDROGEN SULFIDE AND/OR MERCAPTANS FROM A FLUID STREAM

(71) Applicant: Foremark Performance Chemicals, League City, TX (US)

(72) Inventors: Jonathan R. Bingham, Mont Belvieu, TX (US); Marlon Orlando Treasure, Houston, TX (US); Jeremy Lee, Sugar Land, TX (US)

(73) Assignee: Foremark Performance Chemicals, League City, TX (US)

( * ) Notice: Subject to any disclaimer, the term of this patent is extended or adjusted under 35 U.S.C. 154(b) by 26 days.

(21) Appl. No.: 16/788,167

(22) Filed: Feb. 11, 2020

(65) Prior Publication Data
US 2021/0245090 A1    Aug. 12, 2021

(51) Int. Cl.
*B01D 53/14*    (2006.01)
*B01D 53/52*    (2006.01)

(52) U.S. Cl.
CPC .... *B01D 53/1468* (2013.01); *B01D 2252/205* (2013.01); *B01D 2252/20489* (2013.01); *B01D 2257/304* (2013.01); *B01D 2257/306* (2013.01)

(58) Field of Classification Search
None
See application file for complete search history.

(56) References Cited

U.S. PATENT DOCUMENTS

| | | |
|---|---|---|
| 5,000,835 A | 3/1991 | Taylor |
| 5,347,004 A | 9/1994 | Rivers |
| 7,049,275 B2 * | 5/2006 | Ikemoto .......... G03F 7/426 510/176 |
| 7,438,877 B2 | 10/2008 | Salma |
| 8,022,017 B2 | 9/2011 | Taylor |
| 8,022,018 B2 | 9/2011 | Taylor |
| 8,246,813 B2 | 8/2012 | Compton |
| 9,493,711 B2 | 11/2016 | Bertrand, III |
| 2015/0027056 A1 * | 1/2015 | Kortunov .......... B01D 53/1493 48/127.5 |

(Continued)

OTHER PUBLICATIONS

Enaminestore.com, "Safety Data Sheet for (dimethylamino)methyl methyl ether." Published 2015; downloaded on May 5, 2021 from https://www.enaminestore.com/catalog/EN300-1720855.*

(Continued)

*Primary Examiner* — Daniel Berns
(74) *Attorney, Agent, or Firm* — Yancy IP Law, PLLC

(57) ABSTRACT

A solution including at least one mixed acetal compound is used to remove hydrogen sulfide and/or mercaptans from a fluid stream, preferably a fluid gas stream. A mixed acetal compound, as provided in the general structure below, includes an N-glycosidic type bond. The mixed acetal includes nitrogen and oxygen as provided below.

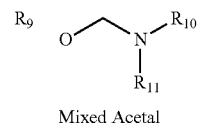

Mixed Acetal

13 Claims, 1 Drawing Sheet

(56) References Cited

U.S. PATENT DOCUMENTS

2018/0185782 A1   7/2018   Subramaniyam

OTHER PUBLICATIONS

Attari et al., "Sampling and analysis of natural gas trace constituents." Institute of Gas Technology, Chicago, IL, published Sep. 1, 1993.*

Kandile, et al. "Synthesis and evaluation of some amine compounds having surface active properties as H2S scavenger", Egyptian Journal of Petroleum, (2014), vol. 23, pp. 323-329.

* cited by examiner

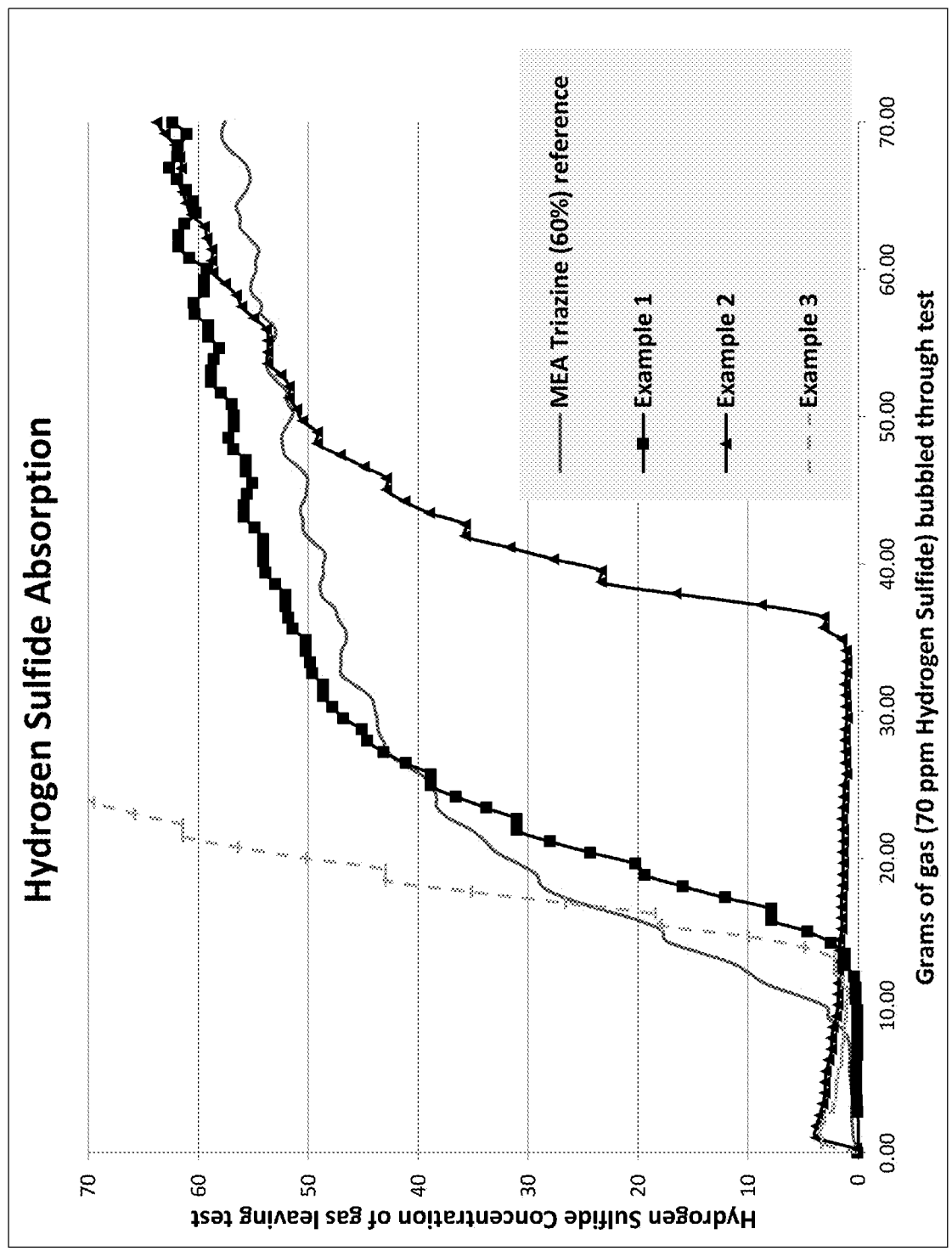

SCAVENGING SYSTEM INCLUDING AT LEAST ONE MIXED ACETAL COMPOUND TO REMOVE HYDROGEN SULFIDE AND/OR MERCAPTANS FROM A FLUID STREAM

BACKGROUND OF THE INVENTION

1. Field of the Invention

The present invention is directed to a scavenging system that includes at least one mixed acetal compound to remove hydrogen sulfide and/or mercaptans from a fluid stream.

2. Description of Related Art

Removing acid gases such as carbon dioxide or hydrogen sulfide is of great importance for numerous applications. Acid gases are not only corrosive and hazardous in the case of hydrogen sulfide. The presence of these gases can make gas streams un-usable, unsellable, or non-compliant in certain applications.

Hydrogen sulfide is naturally occurring in some natural gas and oil. Hydrogen sulfide ($H_2S$) is both corrosive and toxic. To reduce hydrogen sulfide, scavengers such as mono-ethanol-amine (MEA) triazine, metal oxides, formaldehyde, and amines are used. For fluids including low levels of $H_2S$, typically less than 200 ppm $H_2S$, MEA triazines are the preferred chemistry.

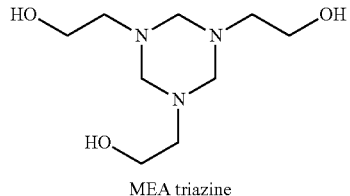 [SMILES: OCCN1CN(CCO)CN(CCO)C1]

MEA triazine

Aminals, as provided in the general structure below, may also be used as a hydrogen sulfide scavenger.

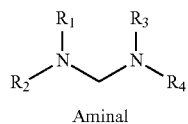

Aminal wherein $R_1$-$R_4$ are hydrogen, alkyl, and/or any carbon chain and/or ring with or without a functional group.

Methylols, as provided in the general structure below, can also be used as hydrogen sulfide scavengers, but they are undesirable. Methylols are in equilibrium between an amine and formaldehyde. Thus, methylols have free formaldehyde present which can cause potential health and environmental concerns.

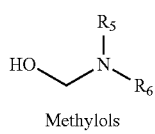

Methylols wherein $R_5$, $R_6$ are hydrogen, alkyl, and/or any carbon chain and/or ring with or without a functional group.

Furthermore, it should be noted that acetals, as provided in the general structure below, do not scavenge well or at all.

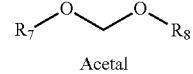

Acetal wherein $R_7$ and $R_8$ are alkyl chain and/or carbon chain and/or ring with or without a functional group.

BRIEF SUMMARY OF THE INVENTION

The present invention is directed to a scavenging system that includes at least one mixed acetal compound to remove hydrogen sulfide and/or mercaptans provided in a fluid stream. Preferably, the scavenging system removes hydrogen sulfide ($H_2S$) to reduce toxicity, reduce corrosion, and reduce odor in a gas or liquid stream.

There are several benefits to using mixed acetals over industry standard scavengers. The raw material cost of mixed acetals according to the present invention are generally lower than the raw material costs of triazines. The lower pH of approximately 8 to 9.5 of the mixed acetals according to the present invention is favorable to the pH of triazines at 9.8 to 12.5. Mixed acetals are less likely to cause solid formation in oilfield application. Also, the mixed acetals according to the present invention have a quicker hydrogen sulfide uptake than many other scavengers. The mixed acetals according to the present invention are more heat resistant than MEA triazine. And, the mixed acetals according to the present invention are less pH sensitive than MEA triazine.

BRIEF DESCRIPTION OF THE DRAWINGS

A detailed description of the invention is hereafter described with specific reference being made to the drawings in which:

FIG. 1 is a graph showing the hydrogen sulfide absorption of a gas stream subjected to several different $H_2S$ scavengers.

DETAILED DESCRIPTION OF THE INVENTION

The present invention, according to certain embodiments, generally relates to compositions, systems, and methods for the removal of hydrogen sulfide and/or mercaptans from a fluid stream, preferably a fluid gas stream. In particular, the present invention relates to compositions, systems, and methods for the removal of hydrogen sulfide and/or mercaptans from a fluid stream, such as a fluid gas stream, using a solution including at least one mixed acetal compound.

Generally, the overall formula of mercaptans is R—SH, wherein R is a hydrocarbon chain. Example of mercaptans include, but are not limited to, methanethiol—$CH_3SH$ [methyl mercaptan], ethanethiol—$C_2H_5SH$ [ethyl mercaptan], 1-propanethiol—$C_3H_7SH$ [n-propyl mercaptan], 2-propanethiol—$CH_3CH(SH)CH_3$ [$2C_3$ mercaptan], allyl mercaptan—$CH_2$=$CHCH_2SH$ [2-propenethiol], butanethiol—$C_4H_9SH$ [n-butyl mercaptan], tert-butyl mercaptan—$(CH_3)_3CSH$ [t-butyl mercaptan], pentanethiols—$C_5H_{11}SH$ [pentyl mercaptan], etc. . . .

A mixed acetal compound, as provided in the general structure below, includes an N-glycosidic type bond. The mixed acetal includes nitrogen and oxygen as provided below.

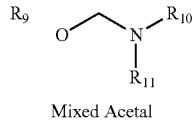

Mixed Acetal

The nitrogen can be in the form of an amine or amide. Many different $R_9$ groups are possible including, but not limited to, alkyls including straight, branched or cyclic alkyl, both saturated and unsaturated, of 1 to 20, preferably 1 to 6, carbon atoms with or without a functional group selected from the group consisted or alcohols, thiols, halides, amines, phosphates, carbonyls, ketones, aldehydes, and imines; and aryl of 5 to 10 carbon atoms with or without a function group selected from the group consisted of alcohols, thiols, halides, amines, phosphates, carbonyls, ketones, aldehydes, and imines. $R_9$ can be smaller including alkyls including straight, branched or cyclic alkyl, both saturated and unsaturated of 1 to 3 carbon atoms with or without a functional group selected from the group consisted or alcohols, thiols, halides, amines, phosphates, carbonyls, ketones, aldehydes, and imines. The mixed acetal may be more hydrophilic for water chemistry by selected an $R_9$ group that includes at least one alcohol, amine, acid, ether, and/or ester functional groups. $R_9$ can also be changed to a more hydrophobic chain such as a fatty alcohol or acid, or t-butyl alcohol as an example to create an oil soluble scavenger. $R_9$ can also be a large molecule such as a polymer or dextrin molecule or even attached to the surface of a polymer of dextrin molecule. $R_{10}$ and $R_{11}$ are independently selected from the groups include, but are not limited to, hydrogen, alkyls including straight, branched or cyclic alkyl, both saturated and unsaturated, of 1 to 20, preferably 1 to 6, or 1 to 3, carbon atoms with or without a functional group selected from the group consisting of alcohols, thiols, halides, amines, phosphates, carbonyls, ketones, aldehydes, and imines; —O—X group wherein X is hydrogen, alkyl including straight, branched or cyclic alkyl, both saturated and unsaturated, of 1 to 20, preferably 1 to 6, carbon atoms with or without a functional group selected from the group consisting of alcohols, thiols, halides, amines, phosphates, carbonyls, ketones, aldehydes, and imines; and aryl of 5 to 10 carbon atoms with or without a function group selected from the group consisting of alcohols, thiols, halides, amines, phosphates, carbonyls, ketones, aldehydes, and imines. Preferred $R_{10}$ and $R_{11}$ groups include 1 to 20, preferably 1 to 6, or 1 to 3, carbon atom alkanols or alkyls.

In preferred embodiments, the at least one mixed acetal compound may be selected from one of the following compositions:

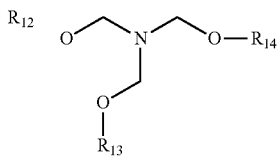

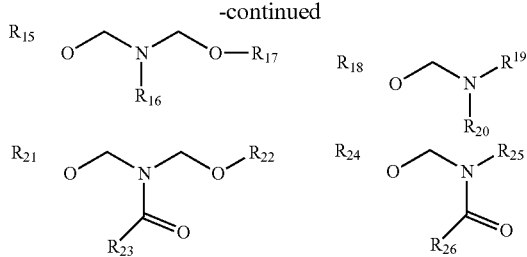

$R_{12}$, $R_{13}$, $R_{14}$, $R_{15}$, $R_{17}$, $R_{18}$, $R_{21}$, $R_{22}$, $R_{23}$, $R_{24}$ and $R_{26}$ are independently selected from the groups include, but are not limited to, alkyl including straight, branched or cyclic alkyl, both saturated and unsaturated, of 1 to 20, preferably 1 to 6, or 1 to 3, carbon atoms with or without a functional group selected from the group consisting of alcohols, thiols, halides, amines, phosphates, carbonyls, ketones, aldehydes, and imines; aryl of 5 to 10 carbon atoms with or without a function group such as alcohols, thiols, halides, amines, phosphates, carbonyls, ketones, aldehydes, and imines. $R_{16}$, $R_{19}$, $R_{20}$ and $R_{25}$ are independently selected from the groups include, but are not limited to, hydrogen, alkyl including straight, branched or cyclic alkyl, both saturated and unsaturated, of 1 to 20 carbon atoms, preferably 1 to 9, or 1 to 6, or 1 to 3, with or without a functional group selected from the group consisted of alcohols, thiols, halides, amines, phosphates, carbonyls, ketones, aldehydes, and imines; —O—X group wherein X is hydrogen, alkyl including straight, branched or cyclic alkyl, both saturated and unsaturated, of 1 to 20, or 1 to 6, or 1 to 2, carbon atoms with or without a functional group selected from the group consisting of alcohols, thiols, halides, amines, phosphates, carbonyls, ketones, aldehydes, and imines; and aryl of 5 to 10 carbon atoms with or without a function group selected from the group consisting of alcohols, thiols, halides, amines, phosphates, carbonyls, ketones, aldehydes, and imines. Preferably $R_{16}$, $R_{19}$, $R_{20}$ and $R_{25}$ are independently selected from the groups include chains of 1 to 9, or 1 to 6, or 1 to 3, carbons including alkyls, alcohols, esters and ethers.

The at least one mixed acetal compound may be selected from ammonia, mono or even disubstituted amines as shown above. Also, the at least one mixed acetal may be selected from amides or mono substituted amides as provided above.

In a preferred embodiment of the present invention, the mixed acetal is not sterically bound. In such a preferred embodiment, the $R_9$, $R_{10}$ and $R_{11}$ do not form steric bonds with one another.

The at least one mixed acetal compound is ideally suited for removing hydrogen sulfide and/or at least one mercaptan, under both concentrated and dilute conditions. In one embodiment, the dilute conditions include fluid gas streams having <10 wt. % hydrogen sulfide and/or at least one mercaptan. In one embodiment, the dilute conditions include fluid gas streams having <5 wt. % hydrogen sulfide and/or at least one mercaptan. In another embodiment, the dilute conditions include fluid gas streams having <2 wt. % hydrogen sulfide and/or at least one mercaptan.

The at least one mixed acetal compound may be provided as a solvent system to the fluid stream, such as a fluid gas stream. The solvent system may include, but is not limited to, water or methanol and water. As such, the at least one mixed acetal compound may be provided as an aqueous mixed acetal solution. As used herein, "an aqueous mixed acetal solution" is intended to refer to a solution that includes at least one mixed acetal compound in accordance with the present invention and water. The definition is not intended to exclude the inclusion of other solvents (for example alcohols) or other additives. Typically, the solution may contain from 90 to 20% (w/w) water, or 60 to 40% (w/w) water.

The at least one mixed acetal compound exhibits greater than predicted hydrogen sulfide and/or mercaptan absorption capacity than found in standard MEA solutions. In one embodiment of the present invention, at least one mixed acetal compound reduces the concentration of hydrogen sulfide and/or at least one mercaptan in a fluid gas stream by at least 20 wt. %, preferably by at least 25 wt. %, more preferably by at least 28 wt. %. In yet another embodiment of the present invention, at least one mixed acetal compound reduces the concentration of hydrogen sulfide and/or at least one mercaptan in a fluid gas stream by at least 20 wt. %, preferably by at least 25 wt. %, more preferably by at least 28 wt. % when the fluid gas stream includes <10 wt. %, or <5 wt. %, or <3 wt. % of hydrogen sulfide and/or at least one mercaptan prior to contact with at least one mixed acetal compound.

EXAMPLES

The foregoing may be better understood by reference to the following examples, which is presented for purposes of illustration and is not intended to limit the scope of the invention.

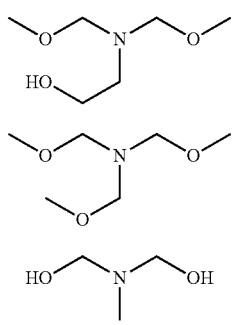

Example 1

Example 2

Example 3

Example 1

100 grams of methanol was added to 169.13 grams of 50% formaldehyde solution. This mixture forms the hemiacetal, i.e. a type of mixed acetal in accordance with the present invention, identified as Example 1 above and is combined with 96.87 grams of MEA.

Example 2

15 grams of aqua ammonia (29%) was slowly added to the 58.3 g of dimethoxy-methane. The resulting mixture was stirred for 12 hours at room temperature to form the hemiacetal, i.e. a type of mixed acetal in accordance with the present invention, identified in Example 2 above.

Example 3

75 grams of MeOH and 95.418 grams of Formalin (49.1%) was mixed for 1 hour. 53.25 grams of methyl amine (50% in water) was added dropwise with cooling forming the compound identified in Example 3 above. Once addition was finished the mixture was cooled to room temperature and stored.

Analysis

To analyze the hydrogen sulfide scavenging abilities of the solutions formed in Examples 1, 2 and 3, 70 ppm hydrogen sulfide gas was bubbled through an aqueous solution at 70 degrees Celsius with the target compounds of Examples 1, 2, and 3 containing 56 mg of scavenger in 300 grams of water. FIG. 1 shows the concentration of hydrogen sulfide in the outlet gas vs. the total amount of gas added.

The chemical scavenger formed by Example 1 shows similar absorption to 60% MEA triazine and 40% water scavenger system.

FIG. 1 shows a quicker uptake of hydrogen sulfide with Examples 1, Example 2 and Example 3 than 60% MEA triazine at low concentrations. Also, Example 2 shows a greater hydrogen sulfide uptake than 60% MEA triazine and 40% water solution.

Although the present invention has been disclosed in terms of a preferred embodiment, it will be understood that numerous additional modifications and variations could be made thereto without departing from the scope of the invention as defined by the following claims:

We claim:

1. A method for reducing the concentration of a compound selected from the group consisting of hydrogen sulfide, mercaptans, and mixtures thereof provided in a fluid stream comprising the step of contacting said fluid stream with a solution including at least one mixed acetal selected from the group consisting of

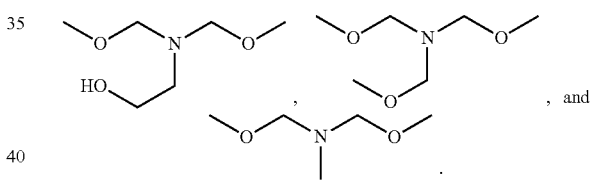

, and

.

2. The method of claim 1, wherein said at least one mixed acetal has a pH of 8-9.5.

3. The method of claim 1, wherein said fluid stream is a fluid gas stream.

4. The method of claim 1, wherein said solution is an aqueous solution.

5. The method of claim 4, wherein said solution includes 20-90 wt. % water.

6. The method of claim 5, wherein said solution includes 40-60 wt. % water.

7. The method of claim 1, wherein said mercaptans are selected from the group consisting of methanethiol—$CH_3SH$ [methyl mercaptan], ethanethiol—$C_2H_5SH$ [ethyl mercaptan], 1-propanethiol—$C_3H_7SH$ [n-propyl mercaptan], 2-propanethiol—$CH_3CH(SH)CH_3$ [$2C_3$ mercaptan], allyl mercaptan—$CH_2=CHCH_2SH$ [2-propenethiol], butanethiol—$C_4H_9SH$ [n-butyl mercaptan], tent-butyl mercaptan—$(CH_3)_3CSH$ [t-butyl mercaptan], pentanethiols—$C_5H_{11}SH$ [pentyl mercaptan], and mixtures thereof.

8. The method of claim 1, wherein said fluid gas streams has <10 wt. % hydrogen sulfide, mercaptans, and mixtures thereof.

9. The method of claim 1, wherein said fluid gas stream has <5 wt. % hydrogen sulfide, mercaptans, and mixtures thereof.

10. The method of claim 1, wherein said fluid gas stream has <2 wt. % hydrogen sulfide, mercaptans, and mixtures thereof.

11. The method of claim 1, wherein said at least one mixed acetal compound reduces the concentration of said hydrogen sulfide, mercaptans, and mixtures thereof provided in said fluid stream by at least 20 wt. %.

12. The method of claim 1, wherein said at least one mixed acetal compound reduces the concentration of said hydrogen sulfide, mercaptans, and mixtures thereof provided in said fluid stream by at least 25 wt. %.

13. The method of claim 1, wherein said at least one mixed acetal compound reduces the concentration of said hydrogen sulfide, mercaptans, and mixtures thereof provided in said fluid stream by at least 28 wt. %.

\* \* \* \* \*